US008659708B2

(12) United States Patent
Cho et al.

(10) Patent No.: US 8,659,708 B2
(45) Date of Patent: Feb. 25, 2014

(54) 3-D POINTING DEVICE, DTV, METHOD OF CONTROLLING THE DTV, AND DTV SYSTEM

(75) Inventors: Sanghyun Cho, Seoul (KR); Joomin Kim, Seoul (KR); Gyuseung Kim, Seoul (KR); Janghee Lee, Seoul (KR); Jaekyung Lee, Seoul (KR); Youngwan Lim, Seoul (KR); Sijin Kim, Seoul (KR); Youk Kwon, Seoul (KR); Kunsik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/383,146

(22) PCT Filed: Jun. 28, 2010

(86) PCT No.: PCT/KR2010/004188
§ 371 (c)(1),
(2), (4) Date: Jan. 9, 2012

(87) PCT Pub. No.: WO2011/004979
PCT Pub. Date: Jan. 13, 2011

(65) Prior Publication Data
US 2012/0162516 A1    Jun. 28, 2012

(30) Foreign Application Priority Data

Jul. 10, 2009  (KR) .................. 10-2009-0062922

(51) Int. Cl.
*H04N 5/50* (2006.01)
*G09G 5/08* (2006.01)
(52) U.S. Cl.
USPC ......................................... 348/734; 345/158

(58) Field of Classification Search
USPC .......... 348/734, 725, 552, 563–569; 345/156, 345/157, 158, 418, 419
See application file for complete search history.

(56) References Cited

U.S. PATENT DOCUMENTS

| 7,826,641 | B2 * | 11/2010 | Mandella et al. | 382/106 |
| 7,839,385 | B2 * | 11/2010 | Hunleth et al. | 345/158 |
| 7,961,909 | B2 * | 6/2011 | Mandella et al. | 382/103 |
| 8,169,405 | B2 * | 5/2012 | Hunleth et al. | 345/158 |
| 8,395,660 | B2 * | 3/2013 | Quennesson | 348/51 |
| 2007/0115252 | A1 * | 5/2007 | Burgmans | 345/156 |

(Continued)

FOREIGN PATENT DOCUMENTS

KR  10-2004-0020262 A   3/2004
KR      10-0548022 B1   2/2006

*Primary Examiner* — Paulos M Natnael
(74) *Attorney, Agent, or Firm* — Birch, Stewart, Kolasch & Birch, LLP

(57) ABSTRACT

The present invention relates to Digital Television (DTV) controlled by a 3-Dimensional (3-D) pointing device, including a receiving unit configured to receive an operation signal generated by a manipulation for the 3-D pointing device; a display configured to display a movable indicator and at least one pop-up object selectable by the indicator when the operation signal is received; and a controller configured to generate a control signal corresponding to the received operation signal and to make the indicator disappear from the display if the operation signal is not received during a preset first time. According to the present invention, the 3-D pointing device may not transmit an operation signal if the 3-D pointing device is not manipulated during a set time. Accordingly, the period for which the power source of the 3-D pointing device is used can be increased by optimizing the consumption of the power source of the 3-D pointing device.

15 Claims, 17 Drawing Sheets

(56) References Cited

U.S. PATENT DOCUMENTS

2007/0257885 A1* 11/2007 Liberty .................... 345/158
2008/0106517 A1* 5/2008 Kerr et al. ................ 345/158
2009/0066647 A1* 3/2009 Kerr et al. ................ 345/158
2009/0102836 A1* 4/2009 Cha et al. ................ 345/419
2011/0169734 A1* 7/2011 Cho et al. ................ 345/157

* cited by examiner

3-D POINTING DEVICE, DTV, METHOD OF CONTROLLING THE DTV, AND DTV SYSTEM

Priority to PCT patent application number PCT/KR2010/004188 filed on Jun. 28, 2010, the entire disclosure of which is incorporated by reference herein, is claimed.

BACKGROUND

1. Field

The present invention relates to a 3-Dimensional (3-D) pointing device, Digital Television (DTV), a method of controlling the DTV, and a DTV system and, more particularly, to a 3-D pointing device, DTV, a method of controlling the DTV, and a DTV system, wherein if the 3-D pointing device is not manipulated during a set time, the 3-D pointing device may not transmit an operation signal, so that the period for which the power source of the 3-D pointing device is used can be increased by optimizing power consumption of the 3-D pointing device.

2. Related Art

Active researches are being carried out on a 3-D pointing device or 3-D remote control using a gyro sensor or an acceleration sensor. The development of applications regarding electronic devices that may be controlled by the 3-D pointing device, however, is not sufficient even though types of the electronic devices are very various.

Recent DTV can provide a variety of functions, such as a function of receiving Electronic Program Guide (EPG), a bi-directional communication function, and an Internet access function, in addition to an analog or digital broadcasting reception function. Furthermore, the DTV may function as a server in a home network environment or a ubiquitous environment.

As the DTV performs increasingly various functions, matters that must be controlled by a user are increasing and becoming complicated. Accordingly, there is a problem in that a remote controller using the existing infrared communication method cannot efficiently control the complicated functions.

In order to solve the problem, the remote controller using the existing infrared communication method may be replaced with a 3-D pointing device. However, a scheme for efficiently controlling DTV using the 3-D pointing device has not yet been sufficiently proposed.

In particular, there is an urgent need for research and development in which a characteristic unique to the 3-D pointing device capable of detecting a 3-D motion can be effectively used in the DTV.

SUMMARY

An object of the present invention to provide a 3-D pointing device, DTV, a method of controlling the DTV, and a DTV system, wherein if the 3-D pointing device is not manipulated during a set time, the 3-D pointing device may not transmit an operation signal. Accordingly, the period for which the power source of the 3-D pointing device is used can be increased by optimizing power consumption of the 3-D pointing device.

Technical objects to be achieved by the present invention are not limited to the above-mentioned object and other technical objects that have not been mentioned above will become evident to those skilled in the art from the following description.

Digital Television (DTV) controlled by a 3-Dimensional (3-D) pointing device according to an aspect of the present invention includes a receiving unit configured to receive an operation signal generated by a manipulation for the 3-D pointing device; a display configured to display a movable indicator and at least one pop-up object selectable by the indicator when the operation signal is received; and a controller configured to generate a control signal corresponding to the received operation signal and to make the indicator disappear from the display if the operation signal is not received during a preset first time.

The controller may make the at least one pop-up object disappear from the display if the operation signal is not received during a preset second time. Here, the second time may be longer than the first time.

The controller may display the indicator in the display again if the operation signal is received again between the first time and the second time.

The indicator may be displayed again at a position where the indicator has disappeared or at the center of the display.

The controller may display the indicator in the display when the operation signal is received. Here, the indicator may be displayed at the center of the display.

The controller may display the indicator in the display only when the operation signal is received. Here, the indicator may be displayed on a pop-up object of high frequency, selected from the at least one pop-up object.

The controller may make the displayed pop-up object disappear from the display or to display another pop-up object associated with the displayed pop-up object, if a point selected in response to the operation signal is outside a region where the pop-up object is displayed.

Another pop-up object may include items of either an up one level group or a down one level group of an item included in the displayed pop-up object.

The operation signal may include at least one of a motion signal generated from the motion sensor of the 3-D pointing device and a button input signal generated by a manipulation for a key button provided in the 3-D pointing device, and the movable indicator may be displayed in the display when any one of the motion signal and the button input signal is received.

The operation signal may include at least one of a motion signal generated from the motion sensor of the 3-D pointing device and a button input signal generated by a manipulation for a key button provided in the 3-D pointing device, and the pop-up object may be displayed in the display when any one of the motion signal and the button input signal is received.

The controller may make the movable indicator or the pop-up object disappear from the display when the button input signal is received.

The operation signal may include at least one of a motion signal generated from the motion sensor of the 3-D pointing device and a button input signal generated by a manipulation for a key button provided in the 3-D pointing device, and at least one of the movable indicator and the at least one pop-up object selectable by the indicator may be displayed in the display when at least one of the motion signal and the button input signal is received.

A method of controlling DTV based on an operation signal received from a 3-D pointing device configured to detect a 3-D motion according to another aspect of the present invention may include the step of receiving the operation signal from the 3-D pointing device; the first display step of displaying a movable indicator and at least one pop-up object selectable by the indicator in a display; and the step of the indicator disappearing from the display if the operation signal is not received during a preset first time.

The method may further include the step of the at least one pop-up object disappearing from the display if the operation signal is not received during a preset second time. Here, the second time may be longer than the first time.

The method may further include the step of displaying the indicator in the display again if the operation signal is received again between the first time and the second time, before the step of the at least one pop-up object disappearing.

The step of displaying the indicator again may include displaying the indicator again at a position where the indicator has disappeared or at the center of the display.

The first display step may be performed when the operation signal is received. Here, the indicator may be displayed at the center of the display.

The first display step may be performed when the operation signal is received. Here, the indicator may be displayed on a pop-up object of high frequency, selected from the at least one pop-up object.

The method may further include the second display step of the displayed pop-up object disappearing from the display or of displaying another pop-up object associated with the displayed pop-up object if a point selected in response to the operation signal is outside a region where the pop-up object is displayed, before the step of the at least one pop-up object disappearing.

The another pop-up object may include items of either an up one level group or a down one level group of an item included in the displayed pop-up object.

The operation signal may include at least one of a motion signal generated from a motion sensor of the 3-D pointing device and a button input signal generated by a manipulation for a key button provided in the 3-D pointing device, and the first display step may be performed when any one of the motion signal and the button input signal is received.

The step of the indicator disappearing may be performed when the button input signal is received.

The operation signal may include at least one of a motion signal generated from a motion sensor of the 3-D pointing device and a button input signal generated by a manipulation for a key button provided in the 3-D pointing device, and the first display step may be performed when any one of the motion signal and the button input signal is received.

A 3-Dimensional (3-D) pointing device according to yet another aspect of the present invention includes a first input unit configured to generate a first signal by detecting a manipulation for a key button provided in the 3-D pointing device; a second input unit configured to generate a second signal by detecting a change of a position of the 3-D pointing device; a transmitting unit configured to transmit at least any one of the first and the second signals to another device; and a controller configured to switch at least any one of the first and the second input units to an activation mode in which the first or second input unit is activated or a deactivation mode in which the first or second input unit is deactivated, wherein the controller may switch to the activation mode when the first signal is generated and maintain the activation mode during a second set time when the second signal is generated within a first set time after the first signal is generated.

The deactivation mode may block the transmission of the transmitting unit.

The deactivation mode may block the function of the first input unit.

A DTV system including DTV and a 3-D pointing device according to further yet another aspect of the present invention includes a transmitting unit configured to transmit an operation signal generated by a manipulation for the 3-D pointing device; a receiving unit configured to receive the operation signal transmitted by the transmitting unit; and a controller configured to generate a control signal for displaying at least any one of a movable indicator and at least one pop-up object selectable by the indicator in a display in response to the received operation signal, wherein the controller may deactivate the function of the transmitting unit and stop the transmission of the transmitting unit, if the operation signal is not generated during a preset first time.

The controller may make any one of the movable indicator and the at least one pop-up object disappear from the display earlier than the other of the movable indicator and the at least one pop-up object, if the operation signal is not received during a preset second time.

The any one may be the movable indicator, and the at least one pop-up object may maintain the display during a preset third time and then disappear from the display. Here, the third time may be longer than the second time.

The deactivated transmitting unit may be activated again when the operation signal is generated, and the controller may generate a control signal for displaying the movable indicator again when the receiving unit receives an operation signal generated from the re-activated transmitting unit between the second time and the third time.

The control signal for displaying the movable indicator again may display the movable indicator again at a position where the movable indicator has disappeared or at the center of the display.

The operation signal may include at least one of a motion signal generated from the motion sensor of the 3-D pointing device and a button input signal generated by a manipulation for a key button provided in the 3-D pointing device, and the function of the motion sensor may be deactivated when the operation signal is not generated during the preset first time.

The operation signal may include at least one of a motion signal generated from the motion sensor of the 3-D pointing device and a button input signal generated by a manipulation for a key button provided in the 3-D pointing device, and the function of the motion sensor may be deactivated when the operation signal is not generated during a preset fourth time. Here, the fourth time may be longer than the first time.

The operation signal may include at least one of a motion signal generated from the motion sensor of the 3-D pointing device and a button input signal generated by a manipulation for a key button provided in the 3-D pointing device, and the control signal for displaying at least any one of the movable indicator and the at least one pop-up object in the display may be generated when at least any one of the motion signal and the button input signal is received.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
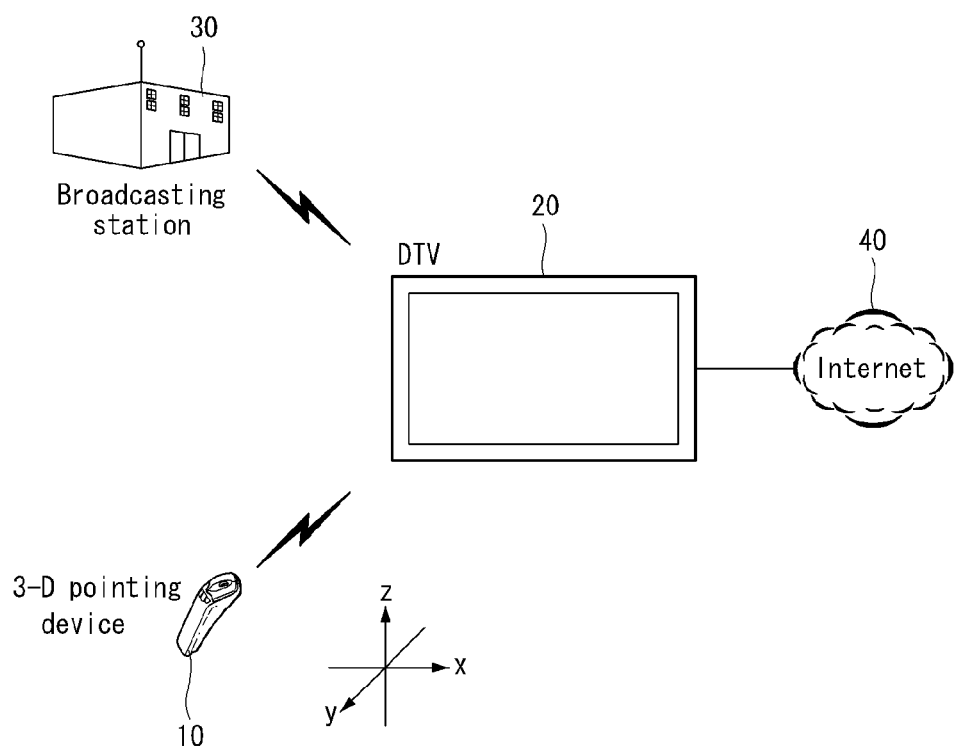
FIG. 1 is a schematic diagram of a system according to an embodiment of the present invention.

The above objects, characteristics, and merits of the present invention will become more apparent from the following detailed description taken in conjunction with the accompanying drawings. Some exemplary embodiments of the present invention are described in detail below with reference to the accompanying drawings. The same reference numerals designate the same elements throughout the drawings. Furthermore, detailed descriptions of the known functions or elements will be omitted if they are deemed to make the gist of the present invention unnecessarily vague. A mobile terminal related to the present invention is described in detail below with reference to the accompanying drawings. It is to be noted that the suffixes of elements used in the following description, such as "module" and "unit," are assigned or mixed in use by taking only easiness of writing this specification into consideration, but themselves are not particularly given importance and roles.

FIG. 1 is a schematic diagram of a system according to an embodiment of the present invention. The present invention may be applied to a system including a 3-D pointing device 10 and DTV 20 as shown in FIG. 1.

The 3-D pointing device 10 can detect a 3-D motion and transmit information about the detected 3-D motion to the DTV 20. The 3-D motion may correspond to a command for controlling the DTV 20. A user may transfer a specific command to the DTV 20 by moving the 3-D pointing device 10 in space. The 3-D pointing device 10 may include various key buttons. A user may input various commands through the key buttons.

The DTV 20 can receive a broadcasting signal from a broadcasting station 30 and output the received broadcasting signal. Furthermore, the DTV 20 may include a device for accessing the Internet 40 in accordance with a Transmission Control Protocol/Internet Protocol (TCP/IP).

Figure 2:
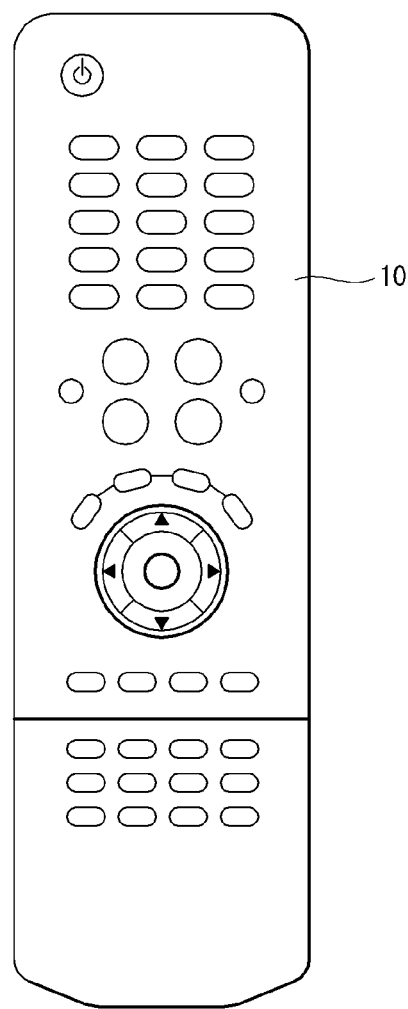
FIG. 2 is a diagram showing an example of an external appearance of a 3-D pointing device according to an embodiment of the present invention.
Figure 3:
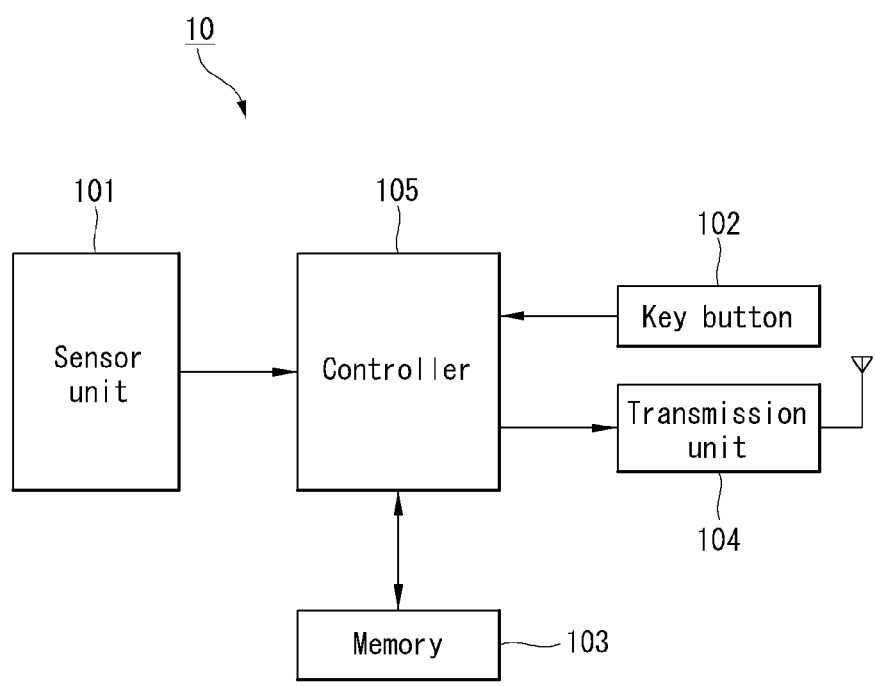
FIG. 3 is a block diagram of the 3-D pointing device according to an embodiment of the present invention.

FIG. 2 is a diagram showing an example of an external appearance of a 3-D pointing device according to an embodiment of the present invention, and FIG. 3 is a block diagram of the 3-D pointing device according to an embodiment of the present invention. The 3-D pointing device 10 according to the embodiment of the present invention is described in detail below with reference to the drawings.

The 3-D pointing device 10 according to the embodiment of the present invention may include a sensor unit 101, a key button 102, memory 103, a transmitting unit 104, and a controller 105.

The sensor unit 101 detects a 3-D motion of the 3-D pointing device 10. The sensor unit 101 may include one or more of a gyro sensor, a gravity detection sensor, an inertia sensor, a geomagnetic sensor, and an acceleration sensor and can detect a 3-D motion of the 3-D pointing device 10 by using one or a combination of one or more of the sensors.

The key button 102 is a unit for receiving various pieces of information or commands from a user. For example, the key button 102 may be provided on the front of the 3-D pointing device 10 as shown in FIG. 2.

The memory 103 stores a specific program for controlling an overall operation of the 3-D pointing device 10 and may temporarily or permanently store data inputted and outputted and various data processed when the controller 105 performs the overall operation of the 3-D pointing device 10.

The transmitting unit 104 transmits information about a motion detected by the sensor unit 101 or a signal received through the key button 102 to the DTV 20.

The controller 105 controls the above elements and generally controls the overall operation of the 3-D pointing device 10 according to the embodiments of the present invention.

Figure 4:
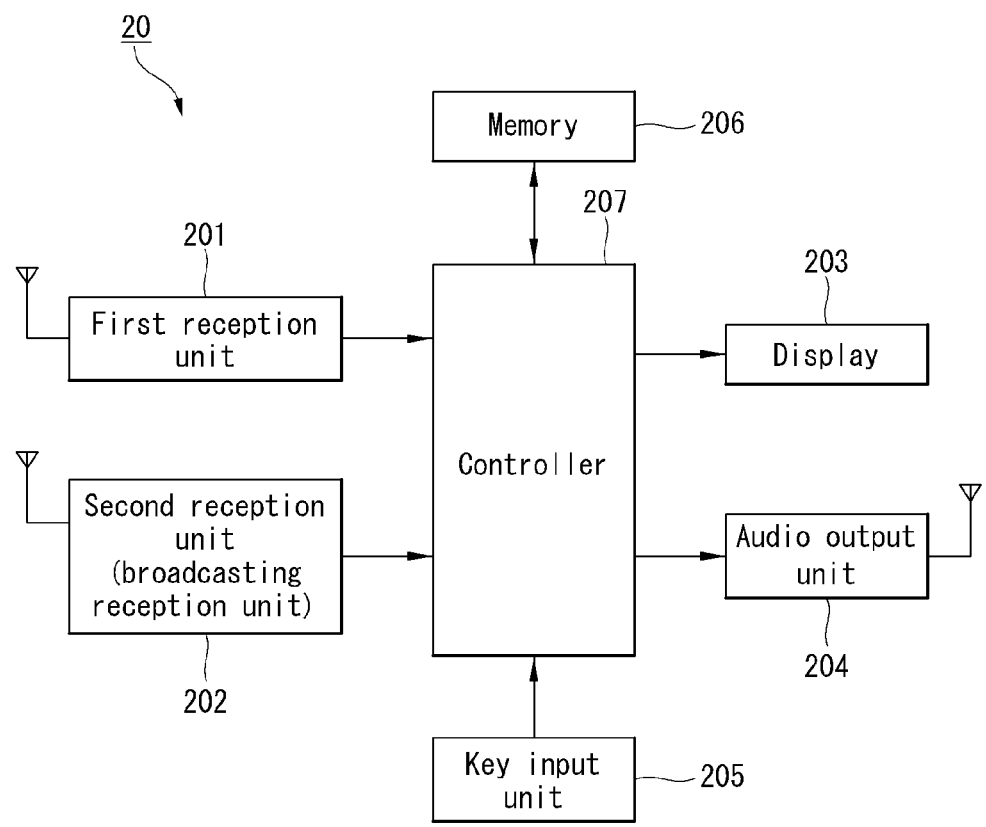
FIG. 4 is a block diagram of DTV according to an embodiment of the present invention.

FIG. 4 is a block diagram of DTV according to an embodiment of the present invention. The DTV according to the embodiment of the present invention is described in detail below with reference to FIG. 4.

The DTV 20 may include a first receiving unit 201, a second receiving unit 202, a display 203, an audio output unit 204, a key input unit 205, memory 206, and a controller 207.

The first receiving unit 201 receives a signal from the 3-D pointing device 10. The first receiving unit 201 and the 3-D pointing device 10 can perform communication in accordance with an RF communication method.

The second receiving unit 202 receives a broadcasting signal from the broadcasting station 30. The broadcasting signal may include at least one of an audio signal and a video signal. The broadcasting signal may further include data broadcasting including text information.

The display 203 displays video information in response to a control signal outputted from the controller 207. For example, the video information may be the video signal included in the broadcasting signal received through the second receiving unit 202, various Graphic User Interfaces (GUIs) provided by the DTV 20, or information indicating the state of the DTV 20.

The audio output unit 204 is a unit for outputting audio information. The audio output unit 204 may include a speaker.

The key input unit 205 is a unit for receiving various pieces of information or commands from a user. For example, the key input unit 205 may be provided on the front or side of the DTV 20.

The memory 206 stores a specific program for controlling an overall operation of the DTV 20. The memory 206 may temporarily or permanently store data inputted and outputted and various data processed when the controller 207 performs the overall operation of the DTV 20.

The DTV 20 may further include a device for accessing the Internet 40 and Audio/Video (A/V) decoding means for decoding A/V signals received from the broadcasting station 30 or the Internet 40, in addition to the above-described elements. The A/V decoding means may be software-processed means or may be hardware-processed means, such as an additional multimedia chip.

The controller 207 controls the above elements and generally controls the overall operation of the DTV 20 according to the embodiments of the present invention.

In the present invention, the DTV 20 performs a function in response to a signal received from the 3-D pointing device 10. Information included in the signal transmitted from the 3-D pointing device 10 to the DTV 20 may be various. For example, the 3-D pointing device 10 may transmit information itself about a 3-D motion of the 3-D pointing device 10 to the DTV 20. Here, the DTV 20 processes a specific function provided by the DTV 20 by processing the information about the 3-D motion of the 3-D pointing device 10. For example, the 3-D pointing device 10 may transmit information about a command for performing a function, provided by the DTV 20, to the DTV 20 by processing the information about the 3-D motion of the 3-D pointing device 10. In this case, the DTV 10 may not receive the information itself about the 3-D motion of the 3-D pointing device 10. For another example, the 3-D pointing device 10 may transmit information about a 3-D motion of the 3-D pointing device 10 and some pieces of information of the information about the 3-D motion to the DTV 20. In this case, the DTV 10 may process the remaining pieces of information which are necessary to perform embodiments of the present invention.

Figure 5:
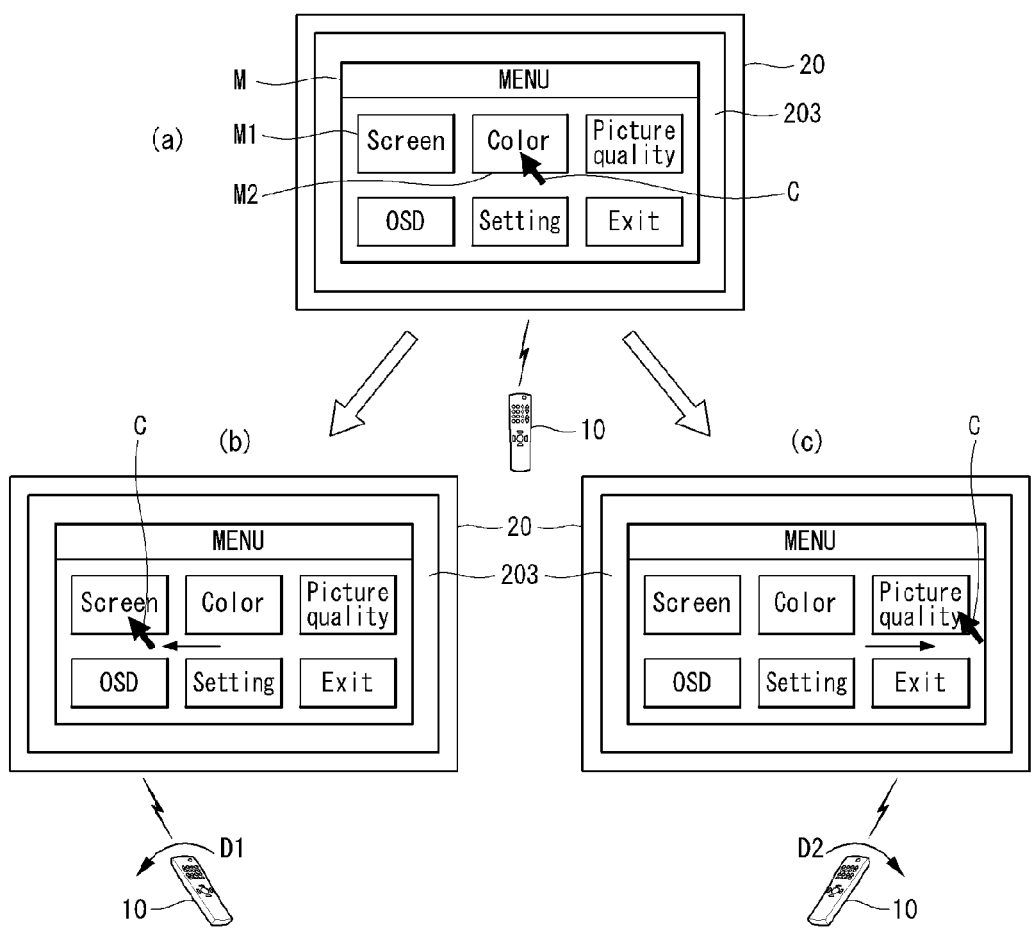
FIG. 5 is a diagram illustrating an operation of a DTV system according to an embodiment of the present invention.

FIG. 5 is a diagram illustrating an operation of a DTV system according to an embodiment of the present invention.

As shown, the DTV system (10, 20) according to the embodiment of the present invention includes the 3-D pointing device 10 and the DTV 20 operated in response to an operation signal generated from the 3-D pointing device 10.

The 3-D pointing device 10 generates an operation signal. The operation signal may be a motion signal generated when a motion sensor (not shown) detects a motion of the body of the 3-D pointing device 10 in 3-D space or may be a button input signal generated when a key button is manipulated. In some embodiments, the operation signal may be a signal in which the motion signal and the button input signal are combined at the same time. For example, when a user shakes the 3-D pointing device 10, a motion signal may be generated. When a user presses a key button of the 3-D pointing device 10, a button input signal may be generated. When a user shakes the 3-D pointing device 10 and, at the same time, presses a key button, a combined signal may be generated. The operation signal generated from the 3-D pointing device 10 may be transmitted through the transmitting unit (104 of FIG. 3) of the 3-D pointing device 10 and received by the first receiving unit (201 of FIG. 4) of the DTV 20.

When the operation signal is received by the receiving unit (201 of FIG. 4) of the DTV 20, the controller (207 of FIG. 4) of the DTV 20 may generate a control signal corresponding to the received operation signal. The control signal may enable the DTV 20 to start a specific operation, to stop the started operation, or to change the started operation. More particularly, a display of the display 203 may be changed as in (a) in response to the control signal.

When an operation signal generated from the 3-D pointing device 10 is received by the DTV 20, a menu M and an indicator C may be displayed in the display 203 of the DTV 20, as indicated in FIG. 5(a).

The menu M may be a kind of pop-up object. The pop-up object refers to various pop-up windows that may be displayed in the display 203. In an embodiment of the present invention, an example in which the pop-up object is the menu M is described, but the pop-up object may be modified in various ways, such as volume control, a change of a channel, and a display of an EPG screen. If the received operation signal matches up with a control signal for displaying the menu M, the menu M is displayed. Relevant items M1 and M2 may be displayed in the menu M.

The indicator C may select the menu M itself or the items M1 and M2 included in the menu M. The indicator C may be moved on the display 203 in response to the operation signal generated from the 3-D pointing device 10. Although an example in which the indicator C is a cursor having an arrow shape is shown in the drawing, a shape of the indicator C is not limited to the cursor.

The operation of the DTV system (10, 20) in FIG. 5(a) in which the menu M and the indicator C are displayed in response to the operation signal is described below.

When the 3-D pointing device 10 is moved in the direction of D1 in the 3-D space as in FIG. 5(b), the indicator C may be moved in a direction, range, and speed matching up with the direction D1 on the basis of a motion signal which may include a moving direction, a moving range, a moving speed, etc. of the 3-D pointing device 10.

Meanwhile, when the 3-D pointing device 10 is moved in the direction of D2 as in FIG. 5(c), the indicator C may be moved in a direction, range, and speed matching up with the direction D2 on the basis of a motion signal which may include a moving direction, a moving range, a moving speed, etc. of the 3-D pointing device 10.

As described above, the DTV system (10, 20) according to the embodiment of the present invention can control the operation of the DTV 20 according to the operation of the 3-D pointing device 10 on the 3-D space.

Figure 6:
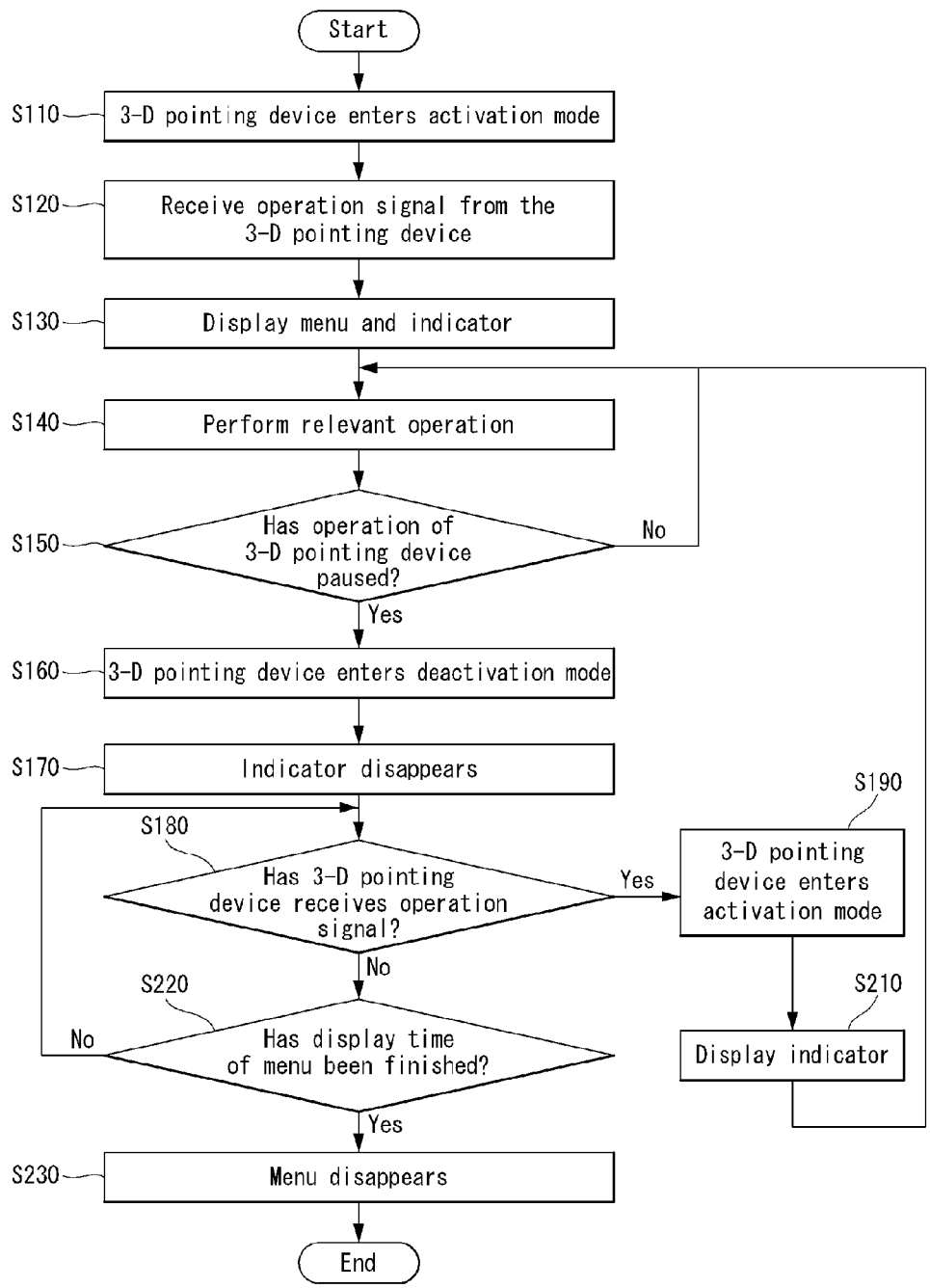
FIG. 6 is a flowchart illustrating an operation of the DTV system according to an embodiment of the present invention.

FIG. 6 is a flowchart illustrating an operation of the DTV system according to an embodiment of the present invention. The operation of the DTV system according to the embodiment of the present invention is described in more detail with reference to FIG. 6 and relevant drawings.

Figure 7:
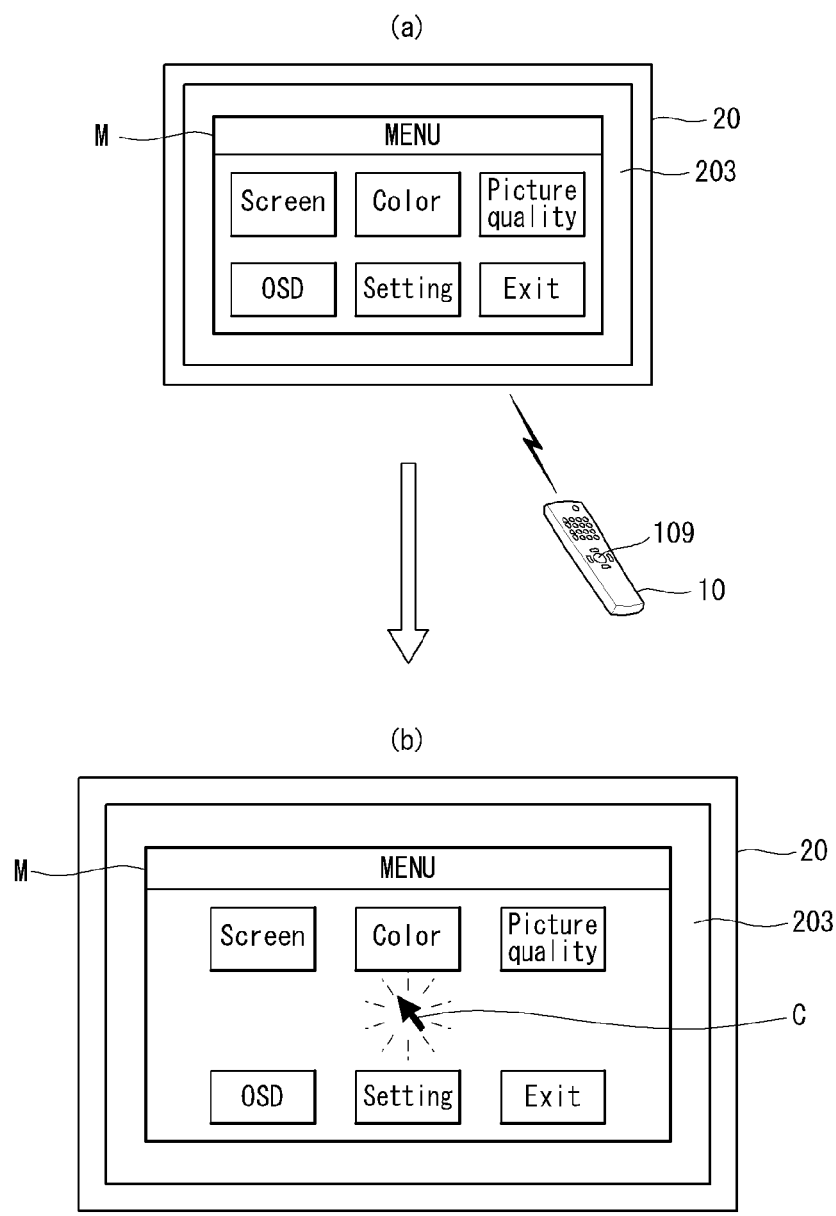
FIG. 7 is a diagram illustrating a process of operating the DTV system according to an embodiment of the present invention.

The operation of FIG. 6 is described below with reference to FIG. 7 showing a process of operating the DTV system according to an embodiment of the present invention is described.

The operation of the DTV system (10, 20) according to the embodiment of the present invention may include the 3-D pointing device 10 entering an activation mode at step S110.

The activation mode means a state in which each of the elements forming the 3-D pointing device 10 can perform a normal function. On the other hand, a deactivation mode means a state in which at least some of the functions of the elements forming the 3-D pointing device 10 are limited. In the deactivation mode in which some functions are limited, power consumption may be reduced as compared with the activation mode. In the activation mode, the transmitting unit (104 of FIG. 3) of the 3-D pointing device 10 consumes electric power while performing RF communication with the first receiving unit 201 of the DTV 20. In the deactivation mode, however, when the function of the transmitting unit (104 of FIG. 3) is limited and the RF communication is stopped, the use of electric power may be reduced that much. The 3-D pointing device 10 is a mobile terminal provided separately from the DTV 20. For this reason, the 3-D pointing device 10 must obtain a power source necessary for an operation through a path different from that of the DTV 20. A battery (not shown) built in the 3-D pointing device 10 is typically used as the power source of the 3-D pointing device 10. When the battery (not shown) is consumed, the battery must be periodically replaced or recharged. If the replacement or recharging of the battery (not shown) is excessively frequent, a user may feel inconvenient. Accordingly, it is necessary to use the battery (not shown) for a longer time. In the 3-D pointing device 10 according to the embodiment of the present invention, the activation mode and the deactivation mode may be alternately changed. In this case, the period for which the battery (not shown) is used can be increased as compared with the case where only the activation mode exists. The switch between the activation mode and the deactivation mode, however, must be performed within a limit where the DTV system (10, 20) can be smoothly operated. The DTV system (10, 20) according to the embodiment of the present invention can optimize the limit.

The DTV system (10, 20) according to the embodiment of the present invention may enter the activation mode when a user pushes a menu button 109 or moves the body of the 3-D pointing device 10 as shown in FIG. 7(*a*). When the 3-D pointing device 10 enters the activation mode, the 3-D pointing device 10 starts communication with the DTV 20. Furthermore, only when the operation of the motion sensor (not shown) is deactivated in the deactivation mode, the function of the motion sensor (not shown) can be activated. Here, it is to be noted that the deactivation of the motion sensor (not shown) includes both the cases where a power source supplied to the motion sensor (not shown) is fully stopped and only a minimum power source is supplied to the motion sensor (not shown). If the power source supplied to the motion sensor (not shown) is fully stopped, a power source for operating the motion sensor (not shown) can be supplied to the motion sensor (not shown) by an operation, such as manipulation for pushing the menu button 109. Meanwhile, if the minimum power source is supplied to the motion sensor (not shown), it means that the motion sensor (not shown) is in a minimum standby state where the motion sensor (not shown) can detect a motion. The motion sensor (not shown) of the standby state may less consume a power source than the motion sensor (not shown) of the activation mode.

When the 3-D pointing device 10 enters the activation mode and starts communication, the DTV 20 may receive a signal from the 3-D pointing device 20 at step S120. As described above, the signal received from the 3-D pointing device 20 may be various. The description of the embodiment of the present invention, however, may replace a description of different kinds of signals because the description is limited to the case where there is a user's input for selecting the menu M.

When the DTV 20 receives the signal, the menu M, such as that shown in FIG. 5(*a*), and the indicator C, such as that shown in FIG. 5(*b*), may be displayed at step S130.

The operation of the DTV system (10, 20) after the step S130 is described below with reference to FIGS. 8 and 9, When the menu M and the indicator C are displayed, a relevant operation may be performed at step S140.

Figure 8:
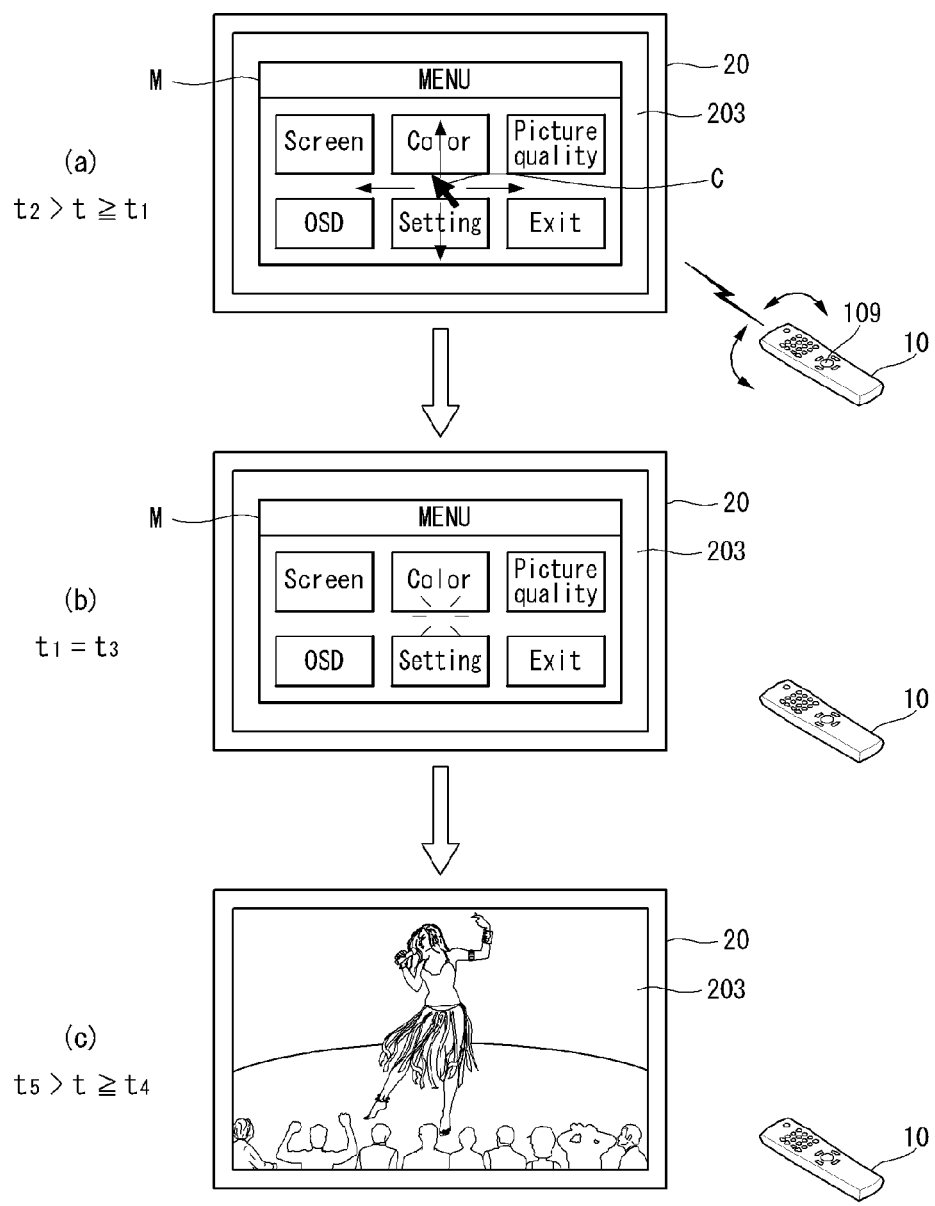
FIG. 8 is a diagram illustrating a process of operating the DTV system according to an embodiment of the present invention.
Figure 9:
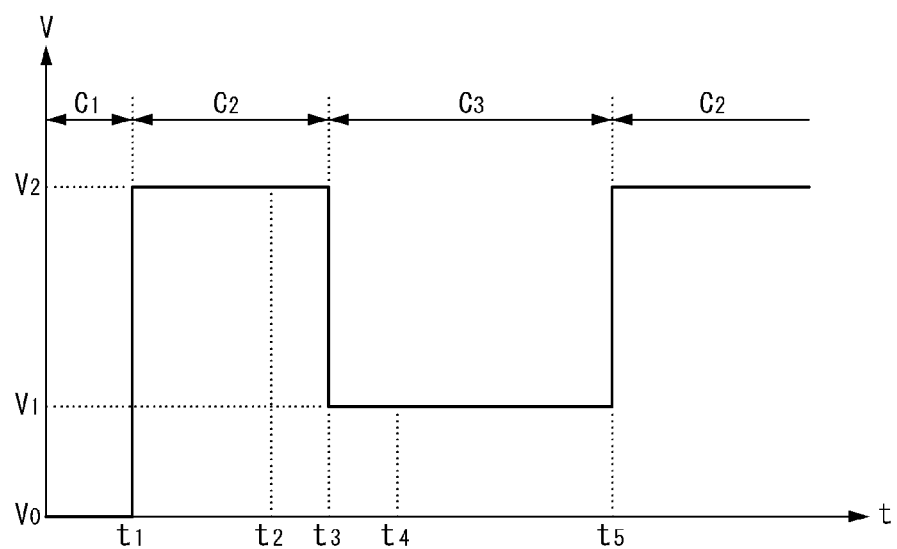
FIG. 9 is a graph showing power consumption of the 3-D pointing device.

As shown in FIG. 8(*a*), a user can move the indicator C by an operation, such as an action of moving the 3-D pointing device 10 on space. Meanwhile, when the operation of FIG. 8(*a*) is taken into consideration in the power consumption aspect of the 3-D pointing device 10, it may be taken as an operation between t1 and t2 in FIG. 9. In FIG. 9, a section C1 has a first state V0 in which a power source supplied to the 3-D pointing device 10 is fully stopped. A section C2 has a second state V2 in which a maximum power source is supplied to the 3-D pointing device 10 because the 3-D pointing device 10 is in the activation mode. A section C3 has a third state V1 in which a minimum power source is supplied to the 3-D pointing device 10 because the 3-D pointing device 10 is in the deactivation mode. As shown, power consumption reaches the second state V2 in the section t1 to t2 in which the user moves the 3-D pointing device 10 as in FIG. 8(*a*).

It may be determined whether the operation of the 3-D pointing device 10 has been stopped for some time at step S150. If, as a result of the determination, the operation of the 3-D pointing device 10 has been stopped for some time, the 3-D pointing device 10 may enter the deactivation mode at step S160.

During the time for which the 3-D pointing device 10 is manipulated, the user may temporally stop the manipulation of the 3-D pointing device 10. If power consumption reaches the second state V2 during the temporary stop, it is inefficient in terms of a reduction of the battery (not shown) included in the 3-D pointing device 10. Accordingly, if the operation is stopped for some time, the 3-D pointing device 10 may enter the third state V1 (i.e., the deactivation mode).

When the 3-D pointing device 10 enters the deactivation mode at step S160, the indicator C may disappear at step S170.

As shown in FIG. 8(*b*), the indicator C may first disappear in the state in which the menu M is displayed. A power source consumed for communication between the DTV 20 and the 3-D pointing device 10 occupies most of a power source consumed by the 3-D pointing device 10. Accordingly, to reduce the power source used for communication may greatly contribute to effective use of the battery (not shown). The indicator C may disappear at a moment when t3 is reached. In other words, at the moment when t3 is reached after some time elapses from the moment t2 when the operation of the 3-D pointing device 10 is stopped, the 3-D pointing device 10 may enter the deactivation mode and the indicator C may disappear as shown in FIG. 8(*b*). A switch to the deactivation mode may also be performed at the moment t2 when manipulation for the 3-D pointing device 10 is stopped. In order to prevent a mode from being switched excessively frequently, it may be preferred that the mode be switched at t3 after some time elapses from the moment t2 when the motion of the 3-D pointing device 10 is stopped.

After the indicator C disappears, it is determined whether an operation signal has been received from the 3-D pointing device 10 at step S180. If the display time of the menu M is finished at step S220 in the state in which the operation signal has not been received from the 3-D pointing device 10, the menu M disappears at step S230.

If the operation signal has not been received until t4 after some time elapses from the moment t3 when the 3-D pointing device 10 enters the deactivation mode, the menu M may disappear as shown in FIG. 8(*c*). Meanwhile, the menu M and the indicator C may disappear when a user performs a specific operation on the 3-D pointing device 10.

If, as a result of the determination at step S180, the operation signal has been received after the indicator C disappears, the 3-D pointing device 10 may enter the activation mode at step S190 and the indicator C may be displayed at step S210.

If a user moves the 3-D pointing device 10 or manipulates the menu button 109, it means that the operation of the 3-D pointing device 10 is activated. At the moment t5 when the operation signal is received, the 3-D pointing device 10 enters the second state V2 in which a maximum power consumption is supplied.

When a user performs a specific operation, the 3-D pointing device 10 may enter the activation mode. In other words, when a user shakes the 3-D pointing device 10 or pushes a key button of the 3-D pointing device 10, the 3-D pointing device 10 may enter the activation mode.

Figure 10:
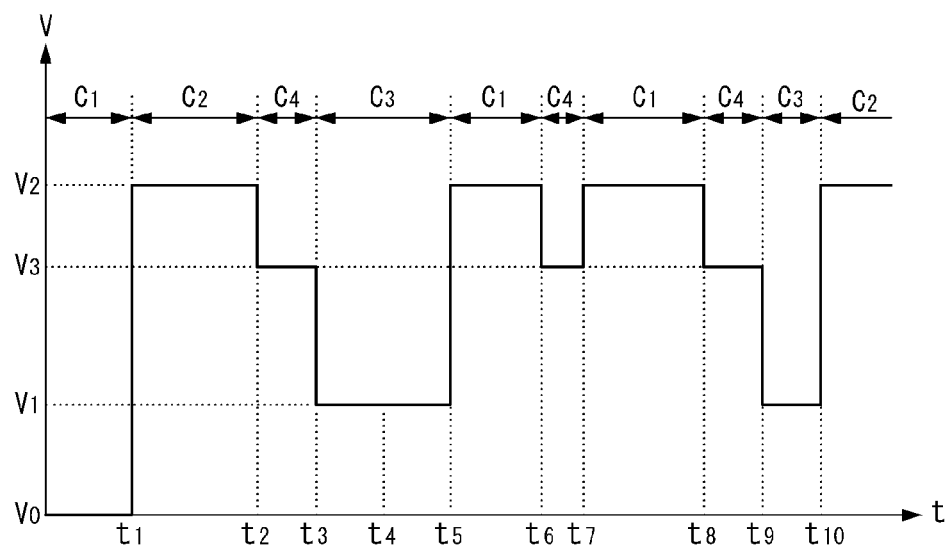
FIG. 10 is a graph showing power consumption of the 3-D pointing device according to another embodiment of the present invention.

FIG. 10 is a graph showing power consumption of the 3-D pointing device according to another embodiment of the present invention. The operation of the 3-D pointing device 10 according to another embodiment of the present invention is different from the operation of the 3-D pointing device 10 according to the embodiment of the present invention in that a fourth state V3 in which a power source is supplied between the second state V2 in which a maximum power source I supplied and the third state V1 in which a minimum power source is supplied. This is described in more detail below.

At a point of time t1 at which the 3-D pointing device 10 enters the activation mode, a power source becomes a maximum and thus becomes the second state V2.

A section C2 in which the maximum power source is supplied may be finished at a point of time t2 at which an operation on the 3-D pointing device 10 is stopped. That is, it means that a section C4 (i.e., a first deactivation mode) in which a power source having the fourth state V3 is supplied may be performed at the point of time t2.

If the 3-D pointing device 10 is not manipulated until a point of time t3 even after the power source having the fourth state V3 is supplied, the 3-D pointing device 10 may enter the third state V1 in which the consumption of a power source is smaller than the consumption of the power source in the fourth state V3. At the point of time t3, the indicator C may disappear, which may be regarded as a second deactivation mode.

If the third state continues up to a point of time t4, the menu M may also disappear. When the menu M disappears, a series of the operations of displaying the menu M and the indicator C are finished.

When a user moves the 3-D pointing device 10 in this state, the 3-D pointing device 10 enters the activation mode. If the 3-D pointing device 10 is not manipulated for some time in the activation mode, the section C4 (i.e., the first deactivation mode) may be performed at a point of time t6. That is, it means that the indicator C disappears.

Figure 11:
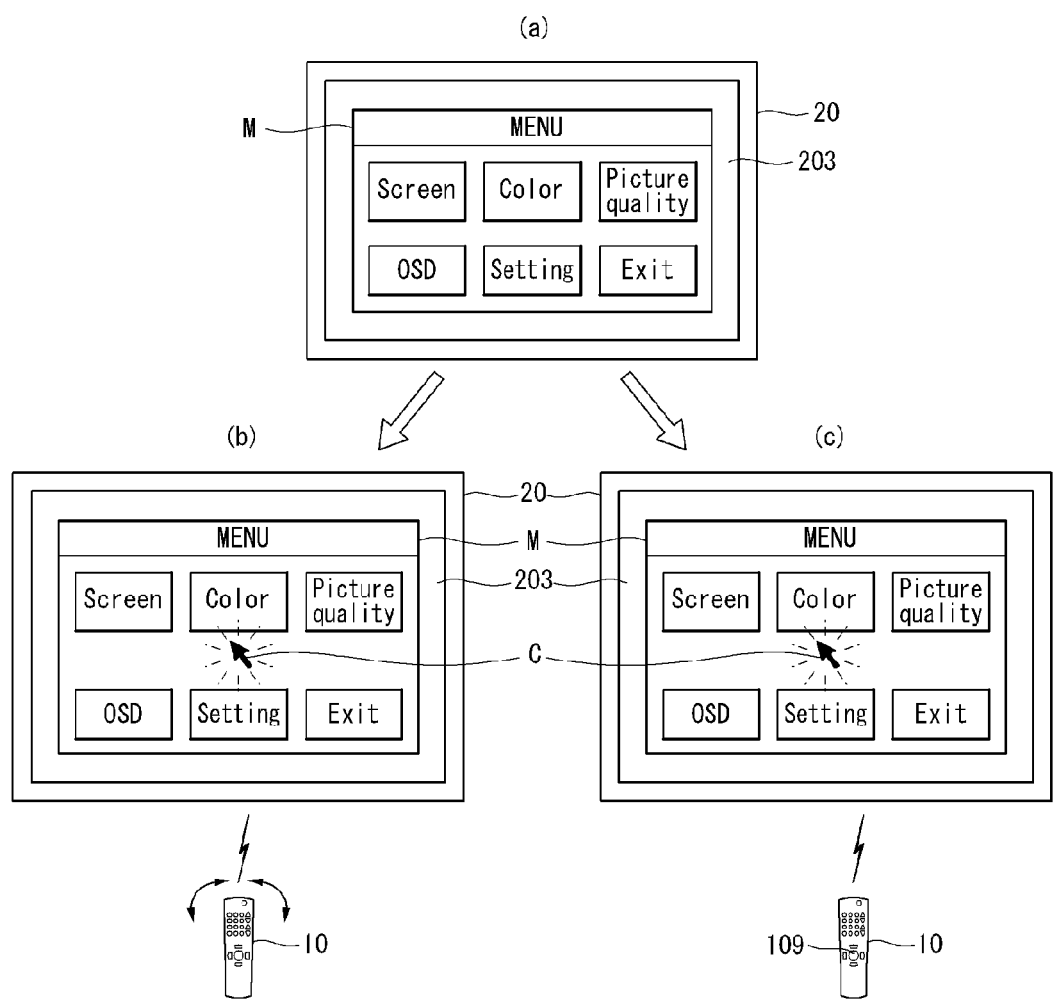
FIG. 11 is a diagram illustrating a process of displaying an indicator in the DTV system of FIG. 10.

If a user moves the 3-D pointing device 10 at a point of time t7, however, the indicator C may be displayed again. In other words, it means that the indicator C has disappeared, but the 3-D pointing device 10 has been manipulated before the menu M disappears. In this aspect, the point of time t7 is different from a point of time t5 at which up to the menu M has fully disappeared and both the menu M and the indicator C are then displayed. The fact that the 3-D pointing device 10 has been manipulated before the menu M disappears can also be seen from the case where the section t6~t7 is narrower than the section t2~t3. The operation of the DTV system (10, 20) at the point of time t7 is described in more detail below with reference to FIG. 11 showing a process of displaying the indicator in the DTV system of FIG. 10.

FIG. 11(a) shows a state right before the point of time t7 in FIG. 10. That is, the menu M is displayed in the display 203, but the indicator C has disappeared at the point of time t6.

When a user moves the 3-D pointing device 10 as shown in FIG. 11(b), the communication function of the 3-D pointing device 10 may be restarted. Accordingly, the DTV receives an operation signal from the 3-D pointing device 10 and displays the indicator C again in response to the operation signal.

As shown in FIG. 11(c), a user may push a key button, such as the menu button 109. When the key button is pushed, the 3-D pointing device 10 generates an operation signal, and the DTV 20 displays the indicator C again in response to the operation signal.

Figure 12:
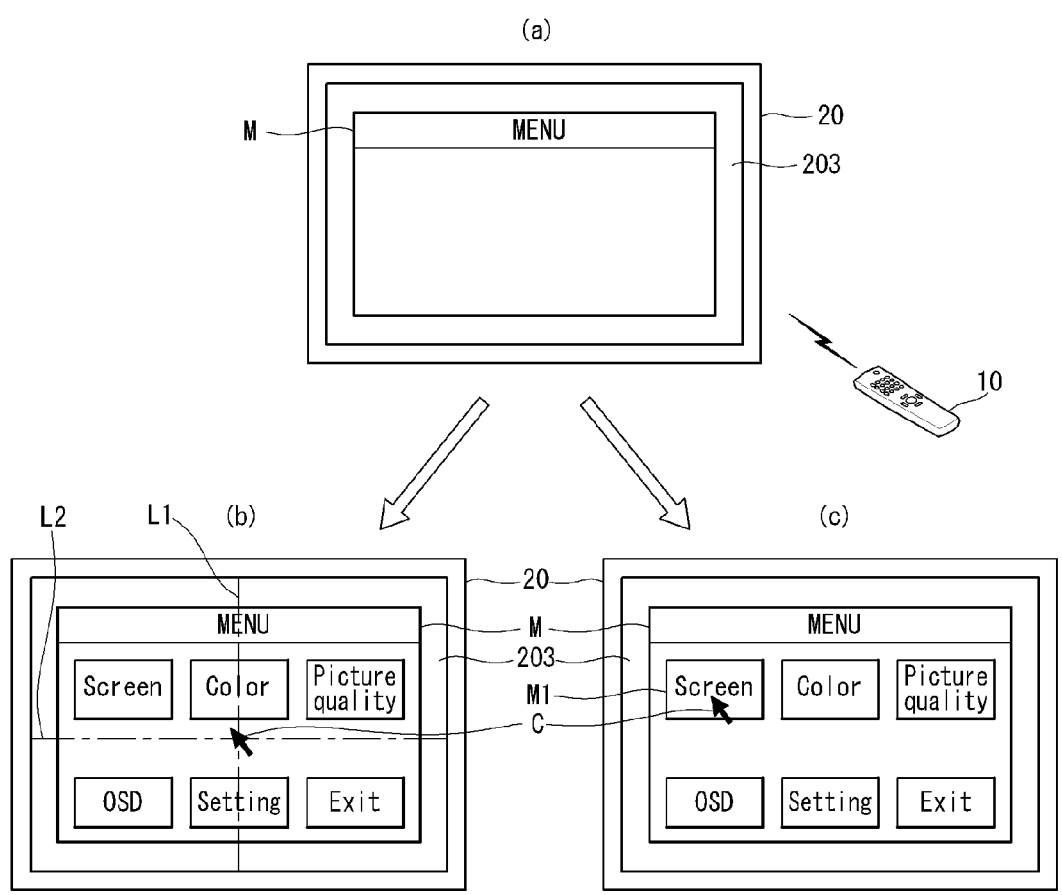
FIG. 12 is a diagram illustrating a process of displaying an indicator in the DTV system according to an embodiment and another embodiment of the present invention.

FIG. 12 is a diagram illustrating a process of displaying the indicator in the DTV system according to an embodiment and another embodiment of the present invention.

As shown in FIG. 12(a), a menu 203 may be displayed in the display 203. The display of only the menu M may correspond to a moment when both the menu M and the indicator C disappear as in t1 and t5 of FIG. 9 to the points of time t1, t5, and t10 of FIG. 10 and they are then displayed or a moment when only the indicator C disappears as in the point of time t7 of FIG. 10. In this state, the DTV 20 may receive an operation signal generated according to user manipulations.

As shown in FIG. 12(b), the DTV 20 may display the indicator C at a point where a vertical center line L1 crosses a horizontal center line L2 in response to the operation signal. If the indicator C is always displayed at the center of the display 203, a user can easily taken a next operation because he can predict a point where the indicator C will be displayed.

As shown in FIG. 12(c), the DTV 20 may display the indicator C on a specific item M1 of the menu M in response to the operation signal. The specific item M1 on which the indicator C is displayed may be selected by taking a high frequency of a user in the past, etc. into consideration. If the indicator C is displayed on the specific item M1 by taking the frequency number, etc. into consideration, a subsequent operation of moving the indicator C in order to select the specific item M1 may not be needed. Accordingly, user convenience can be increased.

Figure 13:
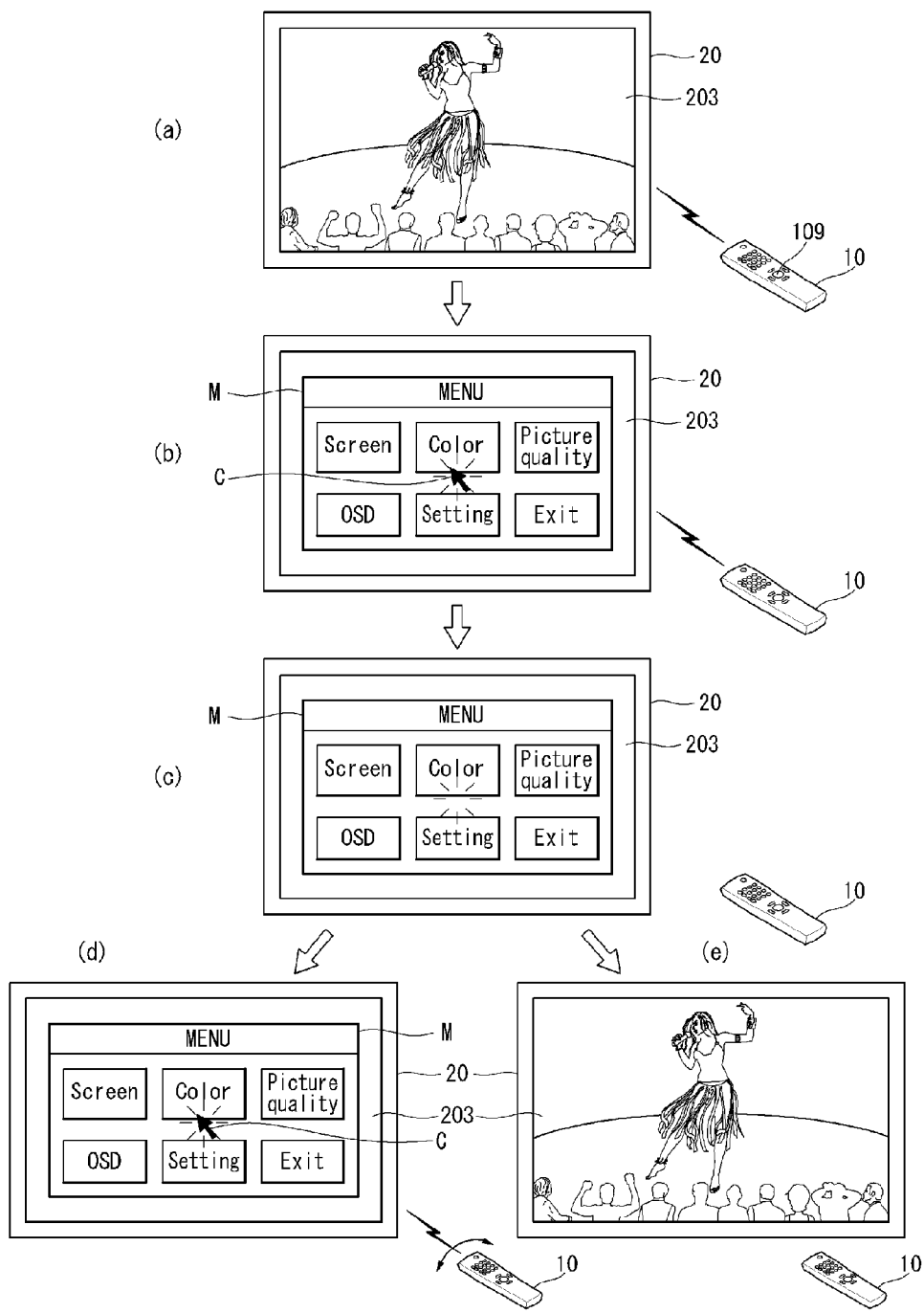
FIG. 13 is a diagram illustrating a process of operating the DTV system according to an embodiment of the present invention.

FIG. 13 is a diagram illustrating a process of operating the DTV system according to an embodiment of the present invention. The operation of the DTV system according to the embodiment of the present invention is described in more detail below with reference to FIG. 13.

As described above in the previous embodiment of the present invention, when a specific motion is generated by pushing the menu button 109 or moving the 3-D pointing device 10 itself, the 3-D pointing device 10 may enter the activation mode. In order to prevent the 3-D pointing device 10 from entering the activation mode when a user unintentionally moves the 3-D pointing device 10, the case where the 3-D pointing device 10 enters the activation mode when the user intentionally pushes the menu button 109 is described in the embodiment of FIG. 13.

As shown in FIG. 13(a), a user of the DTV system (10, 20) may watch broadcasting, etc. through the DTV 20. While watching broadcasting, the user may push the menu button 109. When the menu button 109 is pushed, the transmitting unit (104 of FIG. 3) of the 3-D pointing device 10 generates a relevant signal. The first receiving unit (201 of FIG. 4) of the DTV 20 receives the generated signal.

The DTV 20 may display the menu M and the indicator C in response to the generated signal, as shown in FIG. 13(b). When the menu M and the indicator C are displayed, the user may move the indicator C and perform a desired operation. Meanwhile, in the state in which the menu M and the indicator C are displayed, the user may do not move the 3-D pointing device 10 for some time.

If the user does not move the 3-D pointing device 10 for some time, the display of the indicator C may first disappear as shown in FIG. 13(c). The menu M may continue to be displayed in the display 203 even after the display of the indicator C disappears.

If the user moves the 3-D pointing device 10 in the state in which the display of the indicator C disappears, but the menu M continues to be displayed, the indicator C may be displayed again as shown in FIG. 13(d). This is described in more detail below. If the user does not move the 3-D pointing device 10, the indicator C disappears after a lapse of a set time. If the user does not continue to move the 3-D pointing device 10 even after the indicator C disappears, the display of the menu M disappears. If the user moves the 3-D pointing device 10 in the state in which the display of the indicator C has disappeared, but the display of the menu M has not disappeared, however, the indicator C may be displayed. In this case, the operation on the 3-D pointing device 10 may be an action of shaking the 3-D pointing device 10. Accordingly, the indicator C can be displayed again by only an action of taking up the 3-D pointing device 10 without pushing a button.

If there is no additional operation through the 3-D pointing device 10 even after the display of the indicator C disappears and some time elapses, the display of the menu M may also disappear as shown in FIG. 13(e). Accordingly, a user may continue to watch a desired broadcasting screen, etc. without manipulating an additional button. It is to be noted that, if the user manipulates a specific button or takes a specific motion using the 3-D pointing device 10 at this time, the display of the menu M may be made to disappear.

Figure 14:
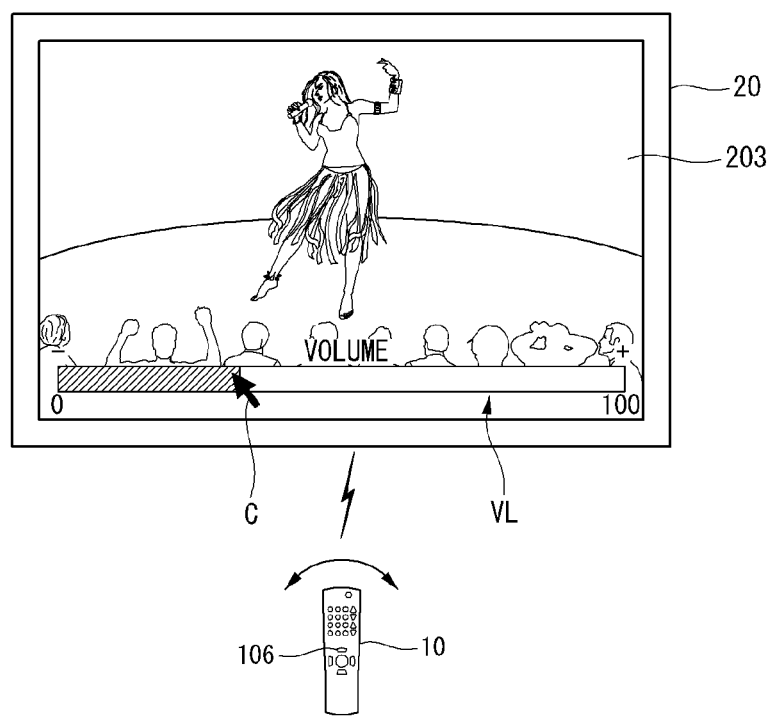
FIG. 14 is a diagram illustrating an indicator display state in the DTV system according to yet another embodiment of the present invention.

FIG. 14 is a diagram illustrating an indicator display state in the DTV system according to yet another embodiment of the present invention.

As shown, the DTV system (10, 20) according to yet another embodiment of the present invention shows an example in which a pop-up object displayed by the 3-D pointing device 10 is a volume control pop-up window VL. The indicator C may be placed at a specific point of the volume control pop-up window VL. When the volume control pop-up window VL is displayed, the volume may be controlled by an action of moving the 3-D pointing device 10 left and right or pushing the volume key button 106.

Figure 15:
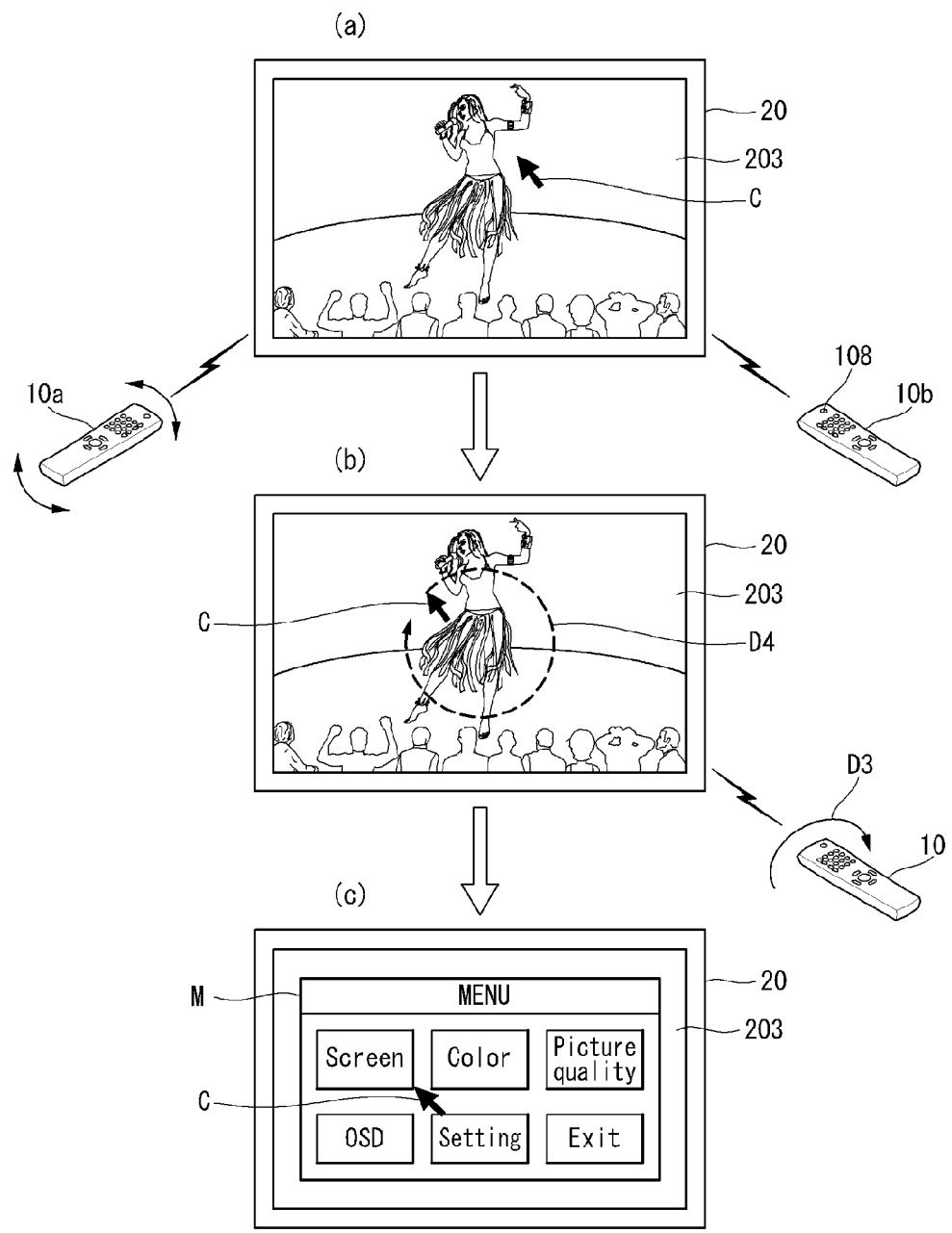
FIG. 15 is a diagram illustrating a process of operating the DTV system according to yet another embodiment of the present invention.

FIG. 15 is a diagram illustrating a process of operating the DTV system according to yet another embodiment of the present invention.

As shown in FIG. 15(a), in the DTV system (10, 20) according to yet another embodiment of the present invention, the indicator C may be displayed in the display 203 by moving the 3-D pointing device 10 or pushing an indicator display key button 108 provided in the 3-D pointing device 10.

When the indicator C is displayed, a user can move the 3-D pointing device 10 in a specific and preset direction D3 as shown in FIG. 15(b). FIG. 15(b) shows an example in which the specific and preset direction D3 is the rotation of a clockwise direction. When the 3-D pointing device 10 is rotated in the direction of D3 and an operation signal is generated from the 3-D pointing device 10, the DTV 20 may display the indicator C in response to the operation signal so that the indicator C is moved in the direction of D4 corresponding to the direction D3.

When the 3-D pointing device 10 is moved in a specific direction, the menu M can be displayed as shown in FIG. 15(c). That is, it means that the motion sensor (not shown) of the 3-D pointing device 10 may be used so that the DTV 20 can perform a specific function.

Figure 16:
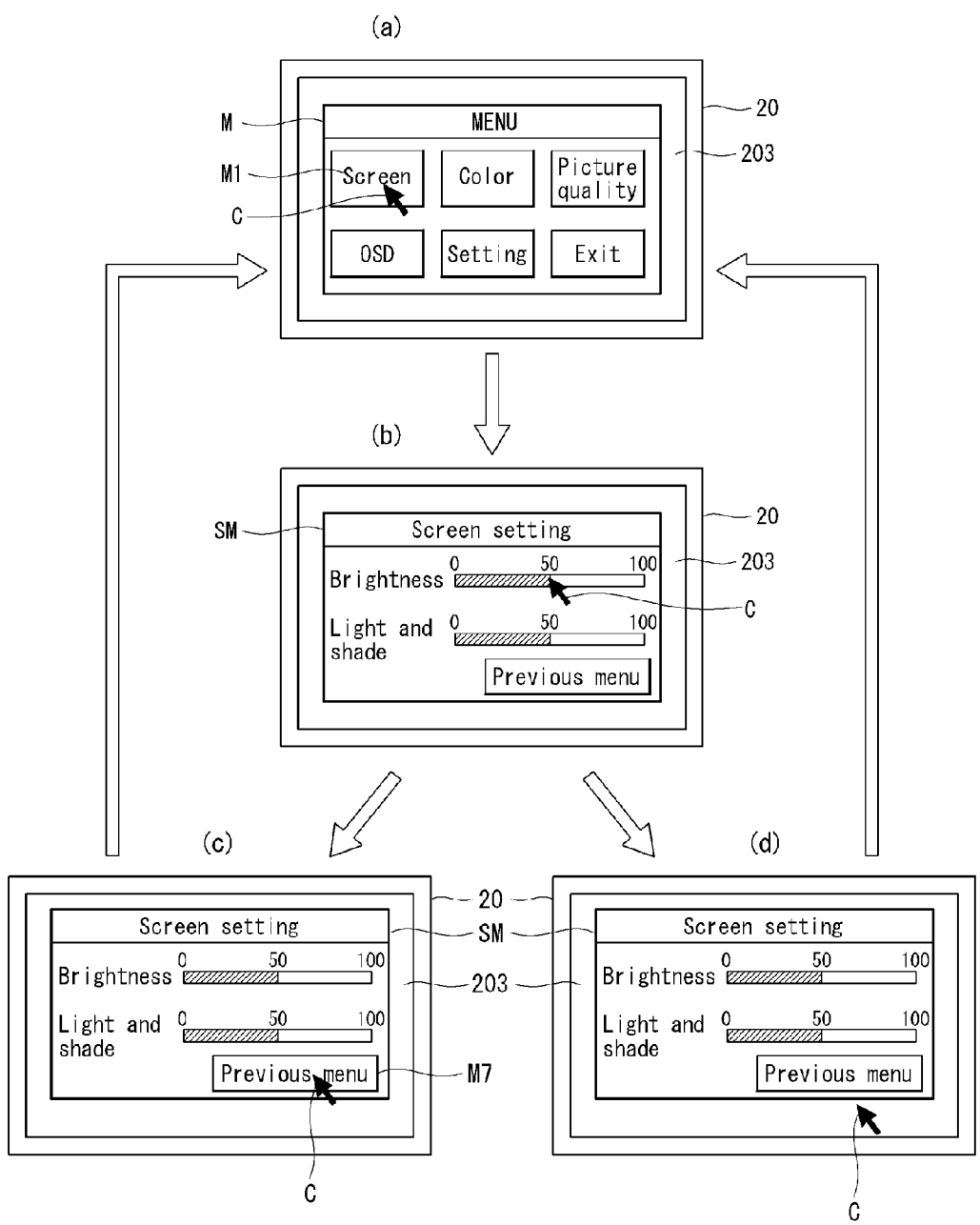
FIG. 16 is a diagram illustrating a process of operating the DTV according to an embodiment and another embodiment of the present invention.

FIG. 16 is a diagram illustrating a process of operating the DTV according to an embodiment and another embodiment of the present invention.

As shown in FIG. 16(a), a specific item M1 of the menu M displayed in the display 203 may be selected using the indicator C. In this drawing, it is assumed that the specific item M1 is screen setting.

When screen setting is selected, a screen setting menu, including a brightness control item and a light and shade control item (i.e., the down one level items of a screen setting item), may be displayed as shown in FIG. 16(b). A user can control brightness and light and shade in the screen setting menu.

Figure 17:
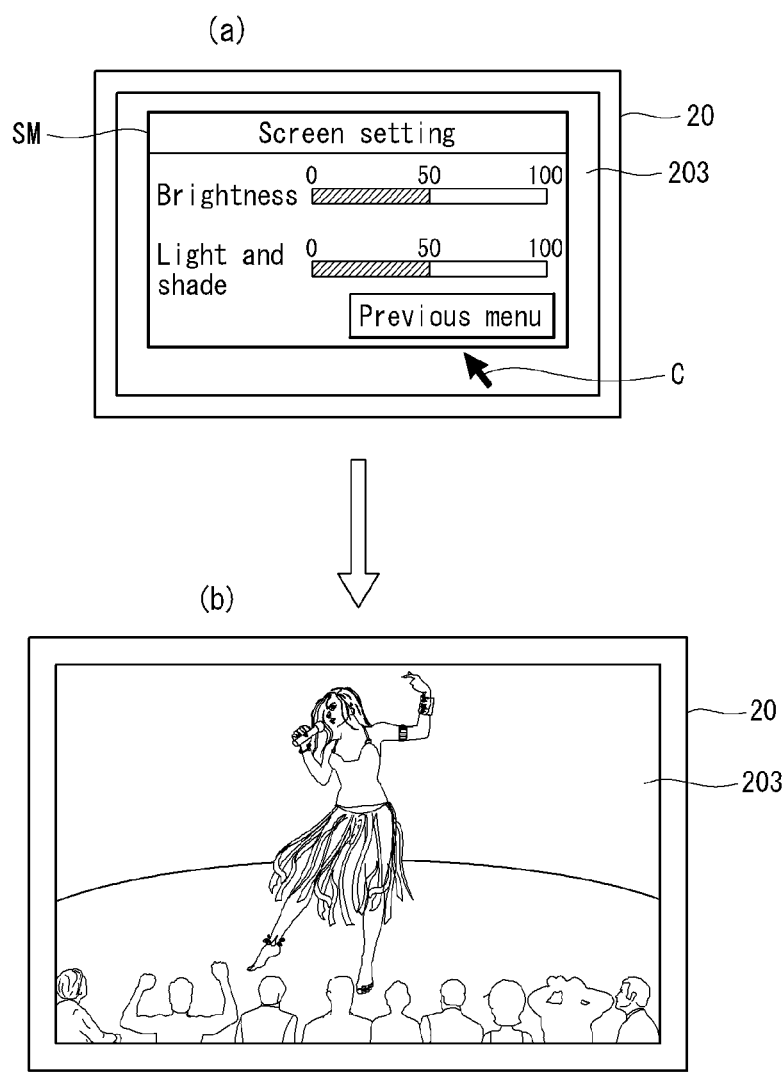
FIG. 17 is a diagram illustrating a process of operating the DTV according to yet another embodiment of the present invention.

After the user finishes controlling the brightness and the light and shade, the user can return to the screen in which up one-level items shown in FIG. 16(a) are displayed by selecting a previous menu button M7 as shown in FIG. 16(c). Furthermore, as shown in FIG. 16(d), the user may return to the screen in which the up one-level items shown in FIG. 16(a) are displayed by selecting a region other than the displayed screen setting menu. FIG. 17 is a diagram illustrating a process of operating the DTV according to yet another embodiment of the present invention.

As shown, in the DTV 20 according to yet another embodiment of the present invention, if a region other than a displayed screen setting menu SM is selected, a pop-up window fully disappears, and a broadcasting screen may be displayed in the display 203. The DTV 20 according to yet another embodiment of the present invention adopts a method of going in the teeth of the menu having a tree structure one by one. In this case, a display of a menu select pop-up window can be conveniently removed as compared with the case where the menu select pop-up window is deviated.

The method of controlling the DTV according to the present invention may be recorded on a computer-readable recording medium in the form of a program for being executed in the computer and then provided. The method of controlling the DTV according to the present invention may be executed by a software program. When the method is executed in software, the constituting elements of the present invention are code segments for executing a specific task. The program or the code segments may be stored in a processor-readable medium or may be transmitted in the form of a computer data signal combined with carriers through a transmission medium or over a communication network.

The computer-readable recording medium may include all kinds of recording devices in which data readable by a computer system is stored. For example, the computer-readable recording medium may include, for example, ROM, RAM, CD-ROM, DVD±ROM, DVD-RAM, magnetic tapes, floppy disks, hard disks, and optical data storages. Furthermore, the computer-readable recording medium may be distributed over computer systems interconnected over a network, so that computer-readable codes may be stored and executed in a distributed manner.

The 3-D pointing device, the DTV, the method of controlling the DTV, and the DTV system according to the present invention may have the following advantages.

First, if the 3-D pointing device is not manipulated during a set time, the 3-D pointing device may not transmit an operation signal. Accordingly, the period for which the power source of the 3-D pointing device is used can be increased by optimizing the consumption of the power source of the 3-D pointing device.

Second, if the 3-D pointing device stops transmitting an operation signal or some time elapses from the time when the 3-D pointing device stops transmitting an operation signal, the indicator disappears. Accordingly, a user can visually check a communication state.

Third, if the 3-D pointing device is manipulated before a pop-up object disappears, the indicator may be displayed by only an action of moving the 3-D pointing device without manipulating a key button.

Fourth, since the indicator is displayed at the center of the display, a user can predict an operation necessary after the indicator is displayed.

Fifth, since the indicator is displayed on an item having a high frequency, a user can select a desired item by only minimum manipulation.

Sixth, when a user makes a specific gesture using the 3-D pointing device, the DTV can execute a specific function matching up with the specific gesture.

Seventh, items belonging to an up one level group or a down one level group can be easily selected.

Eighth, a plurality of steps need not to be performed in order to display a broadcasting screen again in the state in which a pop-up object is displayed.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. Digital Television (DTV) controlled by a 3-Dimensional (3-D) pointing device, the DTV comprising:
    a receiving unit configured to receive an operation signal generated by a manipulation for the 3-D pointing device;
    a display configured to display a movable indicator and at least one pop-up object selectable by the indicator when the operation signal is received; and
    a controller configured to generate a control signal corresponding to the received operation signal and to make the indicator disappear from the display if the operation signal is not received during a preset first time,
    wherein the controller is configured to display another pop-up object associated with the displayed pop-up object, if a point selected in response to the operation signal is outside a region where the pop-up object is displayed, and
    wherein the another pop-up object includes items of either an up one level group or a down one level group of an item included in the displayed pop-up object.

2. The DTV as claimed in claim 1, wherein the controller is configured to make the at least one pop-up object disappear from the display if the operation signal is not received during a preset second time, wherein the second time is longer than the first time.

3. The DTV as claimed in claim 2, wherein the controller is configured to display the indicator in the display again if the operation signal is received again between the first time and the second time.

4. The DTV as claimed in claim 3, wherein the indicator is displayed again at a position where the indicator has disappeared or at a center of the display.

5. The DTV as claimed in claim 1, wherein the controller is configured to display the indicator in the display when the operation signal is received, wherein the indicator is displayed at a center of the display.

6. The DTV as claimed in claim 1, wherein the controller is configured to display the indicator in the display only when the operation signal is received, wherein the indicator is displayed on a pop-up object of high frequency, selected from the at least one pop-up object.

7. The DTV as claimed in claim 1, wherein the controller is configured to make the displayed pop-up object disappear from the display, if a point selected in response to the operation signal is outside a region where the pop-up object is displayed.

8. The DTV as claimed in claim 1, wherein:
    the operation signal includes at least one of a motion signal generated from a motion sensor of the 3-D pointing device and a button input signal generated by a manipulation for a key button provided in the 3-D pointing device, and
    the movable indicator is displayed in the display when any one of the motion signal and the button input signal is received.

9. The DTV as claimed in claim 8, wherein the controller is configured to make the movable indicator or the pop-up object disappear from the display when the button input signal is received.

10. The DTV as claimed in claim 1, wherein:
    the operation signal includes at least one of a motion signal generated from a motion sensor of the 3-D pointing device and a button input signal generated by a manipulation for a key button provided in the 3-D pointing device, and
    the pop-up object is displayed in the display when any one of the motion signal and the button input signal is received.

11. The DTV as claimed in claim 1, wherein:
    the operation signal includes at least one of a motion signal generated from a motion sensor of the 3-D pointing device and a button input signal generated by a manipulation for a key button provided in the 3-D pointing device, and
    at least one of the movable indicator and the at least one pop-up object selectable by the indicator is displayed in the display when at least one of the motion signal and the button input signal is received.

12. A method of controlling DTV based on an operation signal received from a 3-D pointing device configured to detect a 3-D motion, the method comprising:
    receiving the operation signal from the 3-D pointing device;
    displaying a movable indicator and at least one pop-up object selectable by the indicator in a display;
    causing the indicator to disappear from the display if the operation signal is not received during a preset first time; and
    displaying another pop-up object associated with the displayed pop-up object, if a point selected in response to the operation signal is outside a region where the pop-up object is displayed,
    wherein the another pop-up object includes items of either an up one level group or a down one level group of an item included in the displayed pop-up object, and
    wherein the controller is configured to display another pop-up object associated with the displayed pop-up object, if a point selected in response to the operation signal is outside a region where the pop-up object is displayed.

13. The method as claimed in claim 12, further comprising causing the at least one pop-up object to disappear from the display if the operation signal is not received during a preset second time, wherein the second time is longer than the first time.

14. The method as claimed in claim 13, further comprising displaying the indicator in the display again if the operation signal is received again between the first time and the second time, before causing the at least one pop-up object to disappear.

15. The method as claimed in claim 12, wherein:
    the operation signal includes at least one of a motion signal generated from a motion sensor of the 3-D pointing device and a button input signal generated by a manipulation for a key button provided in the 3-D pointing device, and the displaying is performed when any one of the motion signal and the button input signal is received.

\* \* \* \* \*